(12) United States Patent
LeMay et al.

(10) Patent No.: US 6,293,451 B1
(45) Date of Patent: *Sep. 25, 2001

(54) VEHICLE HITCH MOUNTED CARGO CARRIER

(75) Inventors: Lance T. LeMay, Leawood; Tucker D. Trotter, Lenexa, both of KS (US)

(73) Assignee: Outdoor Innovations, Inc., Leawood, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/658,062

(22) Filed: Sep. 8, 2000

Related U.S. Application Data

(62) Division of application No. 09/141,647, filed on Aug. 28, 1998, now Pat. No. 6,152,341.

(51) Int. Cl.[7] ...................................................... B60R 11/00

(52) U.S. Cl. .......................... 224/509; 224/521; 224/523; 224/525; 224/526; 224/527

(58) Field of Search .................................... 224/509, 521, 224/523, 525, 526, 527

(56) References Cited

U.S. PATENT DOCUMENTS

| | | |
|---|---|---|
| 2,451,275 | 10/1948 | Cercownay . |
| 2,718,445 | 9/1955 | Wilson . |
| 2,867,471 | 1/1959 | Coon, Jr. . |
| 3,163,339 | 12/1964 | Mercant . |
| 3,295,473 | 1/1967 | Wentworth . |
| 3,709,159 | 1/1973 | Oglesby, Jr. . |
| 3,795,333 | 3/1974 | Goldstein . |
| 4,089,554 | 5/1978 | Myers . |
| 4,103,960 | 8/1978 | Ziese . |
| 4,369,902 | 1/1983 | Lampeas . |
| 4,671,439 | 6/1987 | Groeneweg . |
| 4,744,590 | 5/1988 | Chesney . |
| 4,887,526 | 12/1989 | Blatt . |
| 4,906,015 | 3/1990 | LaCroix et al. . |
| 4,938,399 | 7/1990 | Hull et al. . |
| 5,029,740 | 7/1991 | Cox . |
| 5,038,983 | 8/1991 | Tomososki . |
| 5,092,503 | 3/1992 | Cocks . |
| 5,106,002 | 4/1992 | Smith et al. . |
| 5,224,636 | 7/1993 | Bounds . |
| 5,232,135 | 8/1993 | Marren . |
| 5,310,100 | 5/1994 | Liscinsky . |
| 5,360,150 | 11/1994 | Praz . |
| 5,368,209 | 11/1994 | Hill . |
| 5,451,088 | 9/1995 | Broad . |
| 5,460,304 | 10/1995 | Porter et al. . |
| 5,570,825 | 11/1996 | Cona . |
| 5,586,702 | 12/1996 | Sadler . |
| 5,593,139 | 1/1997 | Julian . |
| 5,788,135 | 8/1998 | Janek . |
| 5,938,092 | 8/1999 | Johnson . |
| 5,950,617 | 9/1999 | Lorenz . |

Primary Examiner—Allan N. Shoap
Assistant Examiner—Maerena W. Brevard
(74) Attorney, Agent, or Firm—Klye L. Elliott; Blackwell Sanders Peper Martin LLP

(57) ABSTRACT

A hitch carrier (20) utilizes a telescoping assembly (40) to shiftably mount a cargo unit (26) to a trailer hitch (32) of a vehicle (28). The cargo unit (26) moves between traveling and remote positions. In the remote position, the closure structure (30) of the vehicle (28) can swing open unobstructed by the cargo unit (26). The hitch carrier (20) has an automatic latch mechanism (36) having a pivoting latch (86) which automatically holds the cargo unit (26) in the remote position and automatically releases the cargo unit (26) when it is forced toward the vehicle (28). The hitch carrier (20) also includes an expandable sleeve (135) to cover the telescoping assembly (40), and an auxiliary equipment carrier (42) to carry larger equipment (174). A lock assembly (38) is provided to hold the cargo unit (26) in the traveling position, and the lock assembly includes a lock pin (120) received in nylon bushings (130,132). Further, cargo unit extension members (44,46) are attachable to the cargo unit (26) to increase cargo space.

11 Claims, 5 Drawing Sheets

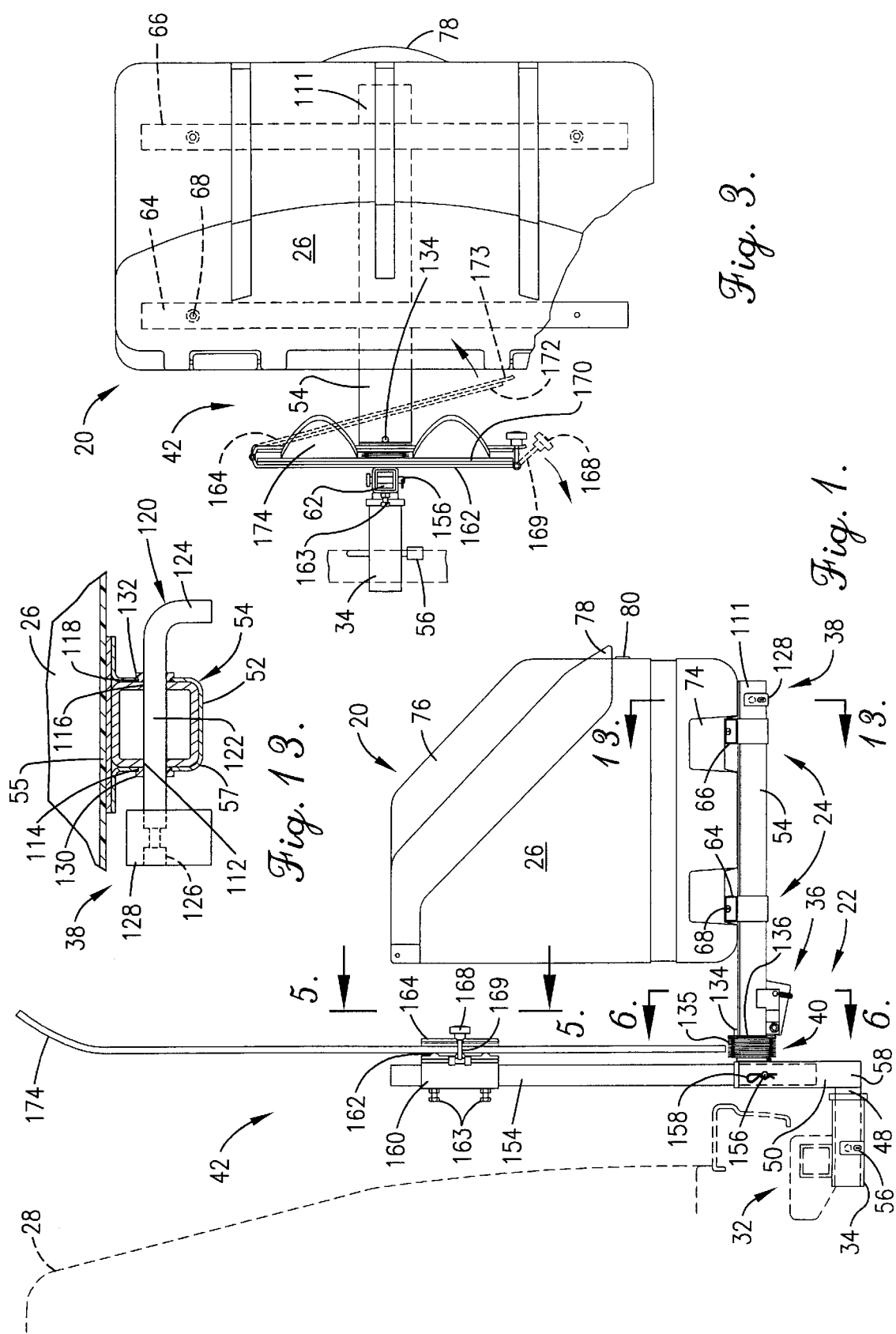

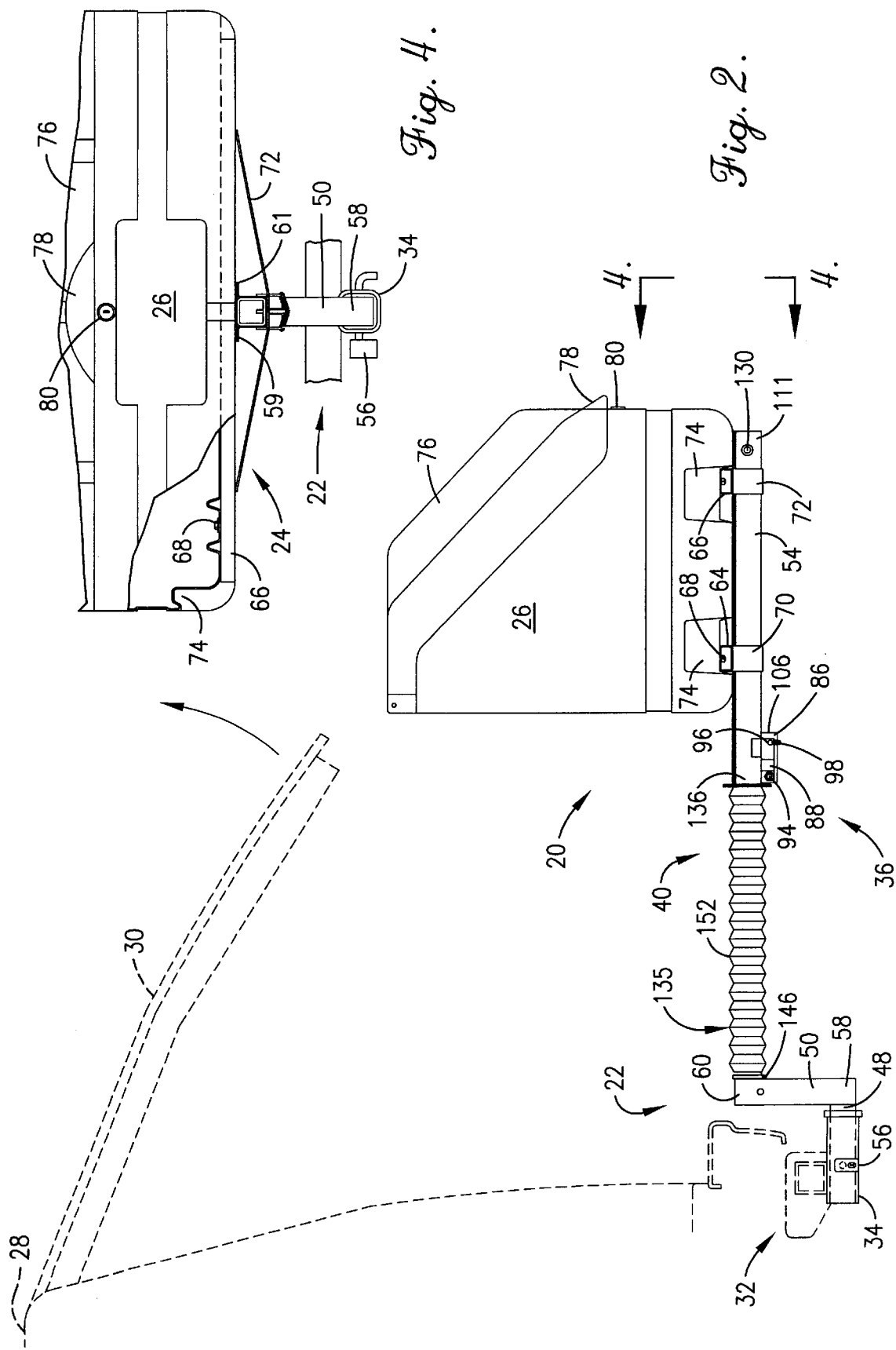

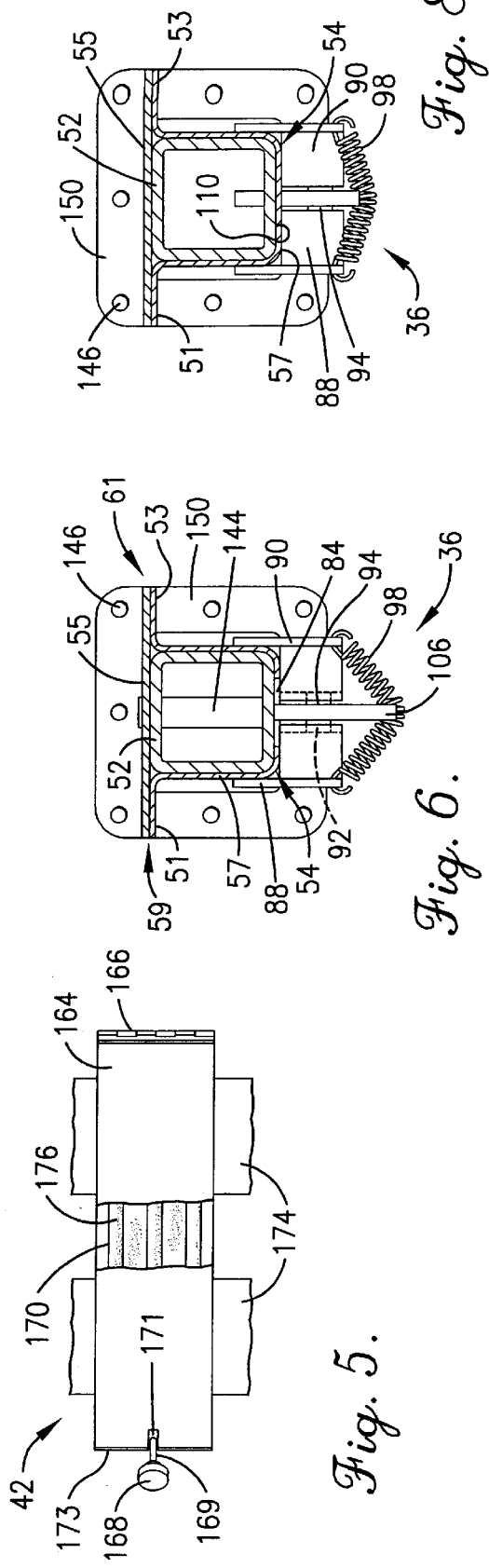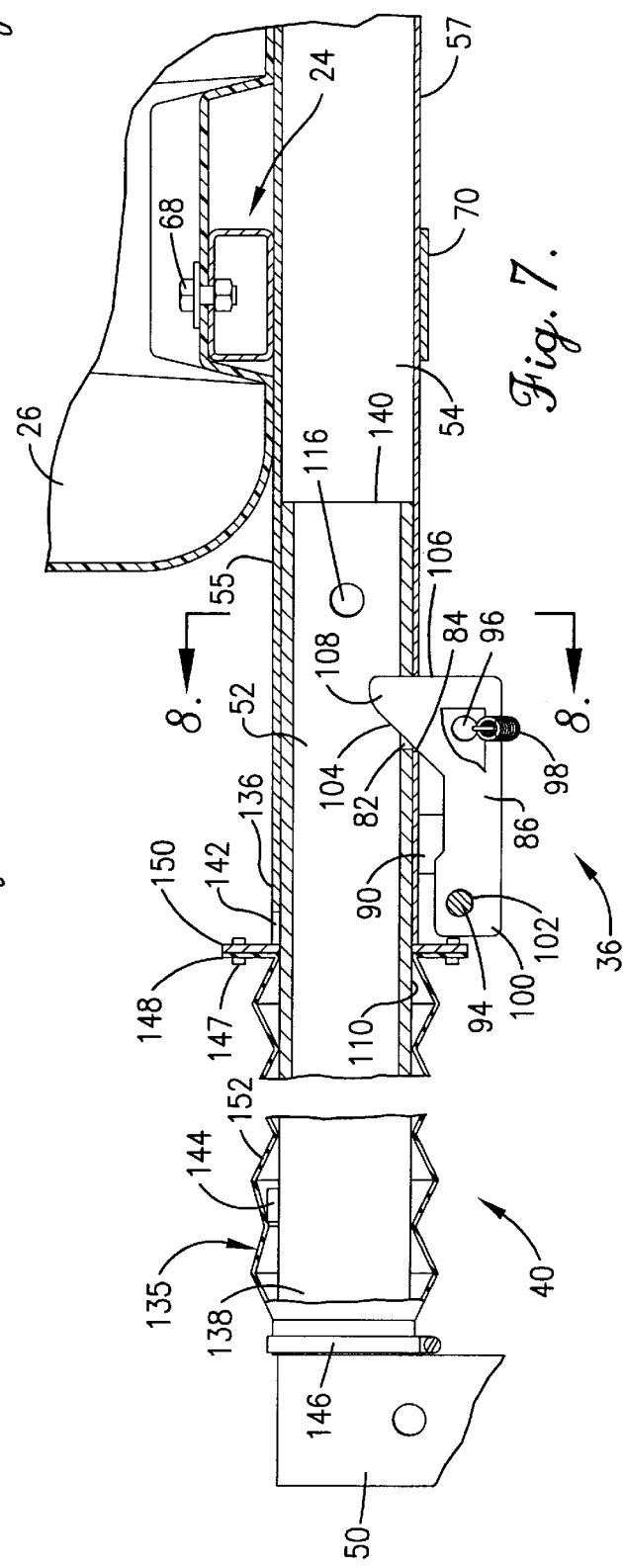

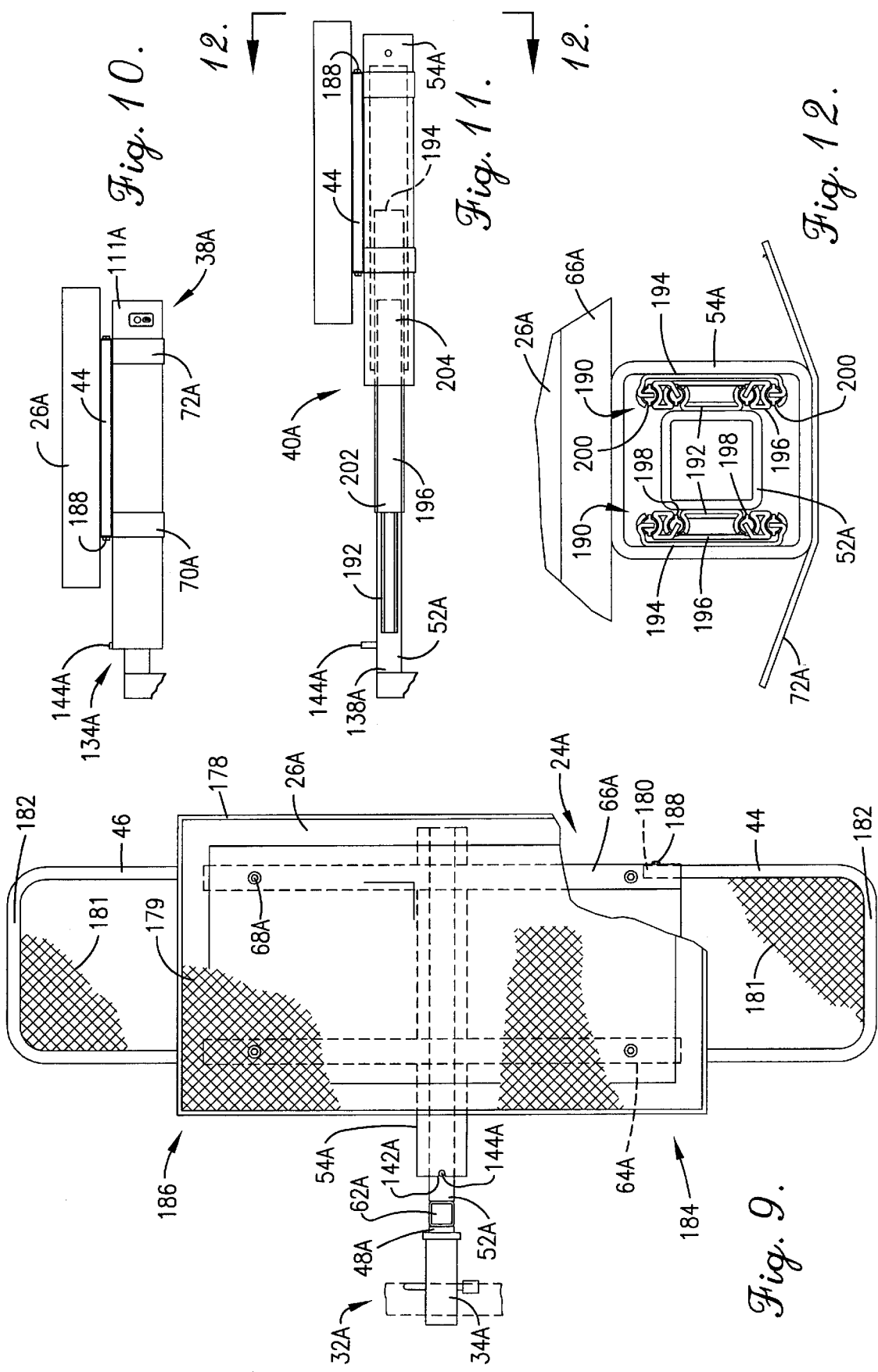

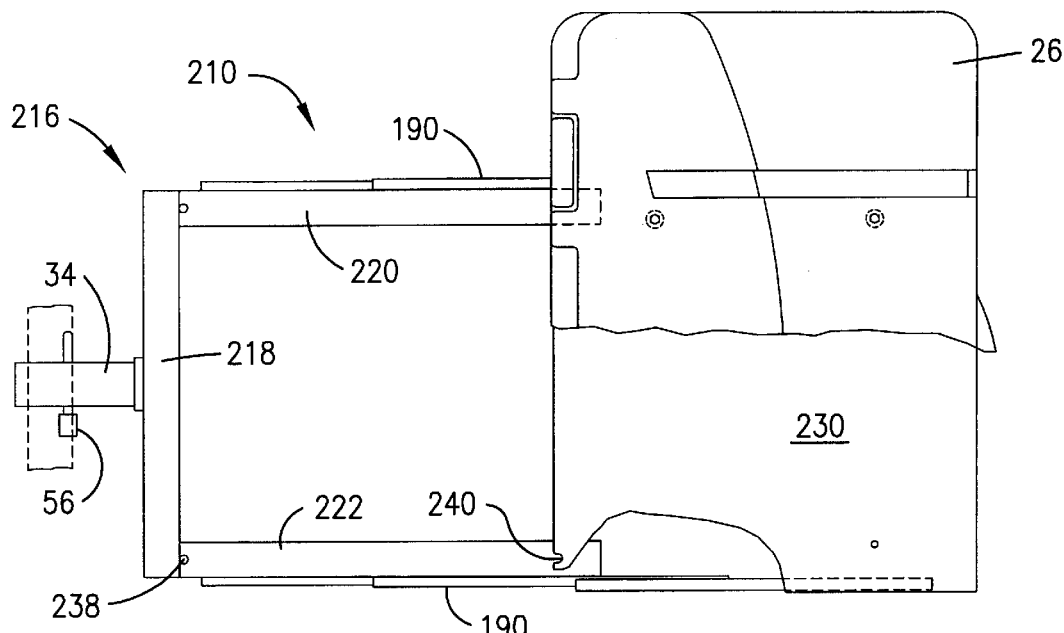
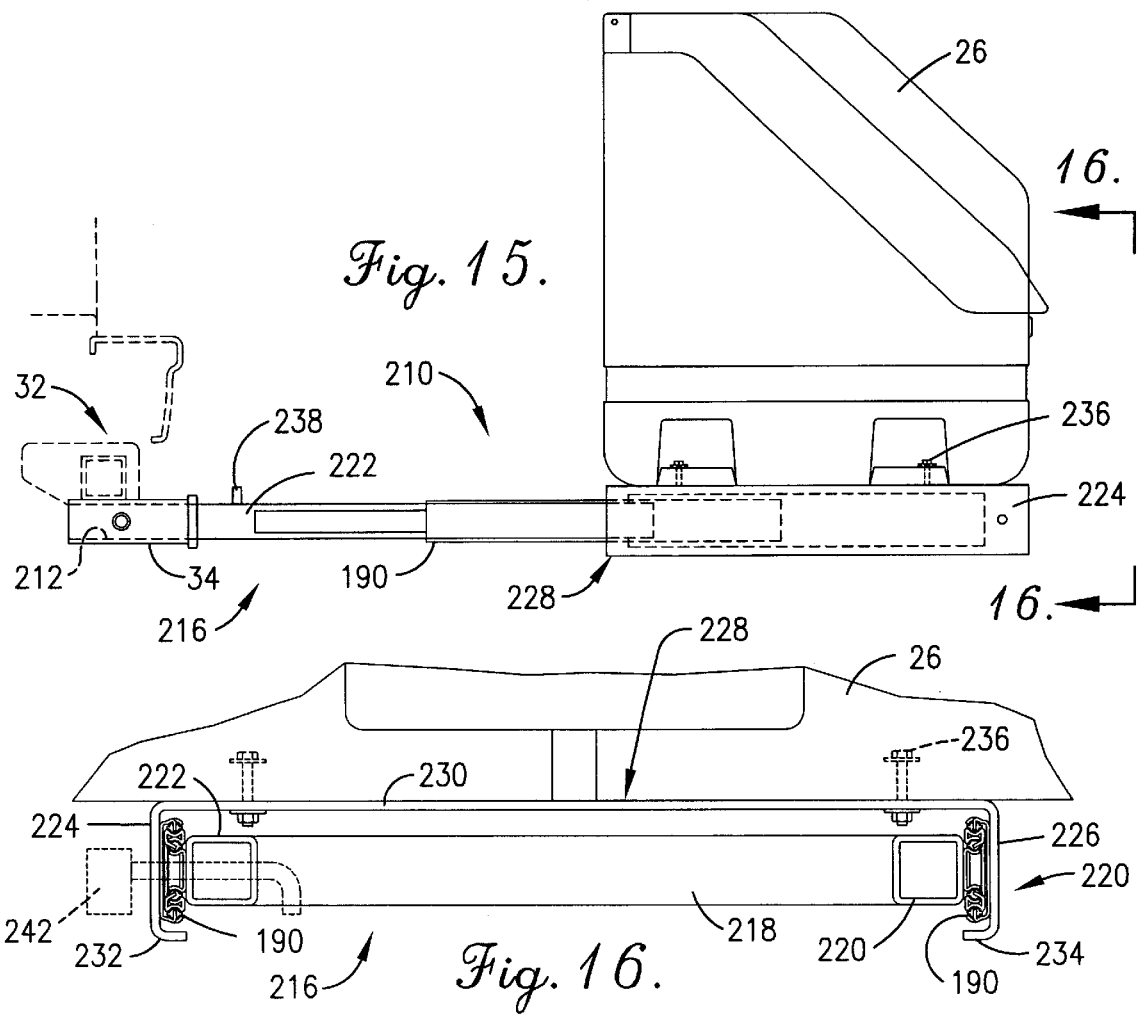

VEHICLE HITCH MOUNTED CARGO CARRIER

This application is a division of and claims priority on application Ser. No. 09/141,647, filed Aug. 28, 1998, now U.S. Pat. No. 6,152,341

BACKGROUND OF THE INVENTION

1. Field of the Invention

This invention relates to cargo and luggage carriers and their attachment to vehicles. More particularly, the invention relates to carriers which are shiftably attachable to standard trailer hitches for rearward movement away from rear closure structures of vehicles.

2. Description of Prior Art

When traveling in a single family passenger vehicle, whether going to the airport, taking a day trip to the bike trails, or heading for the ski slops, there seldom seems to be enough space for luggage and other necessary equipment. To provide extra cargo space, many types of carriers including trailers and car top carriers have been developed. Car top carriers operate like sails reducing gas mileage and decreasing vehicle control. Trailers decrease vehicle control and, for the average driver, trailers substantially limit vehicle maneuverability. Limited maneuverability is most prominent when backing up.

Another type of carrier, a hitch carrier, attaches to a standard trailer hitch and is suspended by the hitch above the road surface. The hitch carrier is held behind the vehicle and therefore does not appreciably reduce gas mileage, and the hitch carrier is suspended above the road surface without wheels and therefore does not appreciably limit maneuverability. Even when backing up, the hitch carrier merely extends the length of the vehicle.

One disadvantage encountered is that the hitch carrier blocks the rear entrance of the vehicle. This is solved by shiftably attaching the carrier to the trailer hitch, so that the carrier is movable to a remote position which does not obstruct the closure structure of the vehicle rear entrance. However, shiftably attaching the carriers presents other problems such as noise from rattling parts, dangerous moving components which can come apart or trap fingers, and lack of stability in both a traveling position and in the remote position.

Further, hitch carriers are not well adapted to carry all equipment. While, for example, most camping equipment will fit inside the storage area of hitch carriers, larger or odd shaped items, such as skies and bikes for example, cannot be carried by currently available hitch carriers. Sometimes, even the additional space provided by the hitch carrier is still not enough leaving people in a quandary trying to decide what vital equipment must stay behind.

OBJECTS AND SUMMARY OF THE INVENTION

In view of the foregoing, it is an object of the present invention to provide an improved shiftable hitch carrier which makes less noise during travel.

It is another object of the present invention to provide an improved shiftable hitch carrier which increases safety.

It is still another object of the present invention to provide and improved shiftable hitch carrier with increased capabilities for carrying large and odd shaped equipment.

The present invention achieves these objects and other objects that become evident from the following detailed description of the preferred embodiments of the invention by providing an improved hitch carrier adapted to be removably mounted at the rear of a vehicle having a swingable closure structure for closing a rear entrance of the vehicle and provided with a conventional hitch. The carrier includes a frame assembly with a rear section slidably mounted to a midsection for sliding movement relative to the rear entrance of the vehicle between a traveling position and a remote position which allows access to the rear entrance of the vehicle to open the closure structure. In a preferred embodiment, freely rotatable components join the carrier supporting rear section of the frame assembly to the midsection of the assembly, so that minimal physical effort is required to move the carrier toward and away from the back of the vehicle even when the carrier is loaded to its maximum cargo weight capacity. The rotatable components are preferably a plurality of ball bearings which ride in tracks defined between vertically oriented slides on each side of the frame assembly midsection to support the weight of the rear frame section, the cargo carrier, and the load in the carrier. The ball bearings allow virtually frictional in and out telescoping relative movement of the rear section with respect to the midsection which is received in the rear section.

In one embodiment, the carrier includes a latch mechanism for automatically latching the rear section to the midsection when the rear section has been moved to the remote position. The latch mechanism automatically unlatches the rear section of the frame assembly from the midsection when the rear section is moved forwardly toward the rear entrance of the vehicle. Preferably, the latch mechanism has a catch opening and a pivoting latch which is automatically introduced into the catch opening by a biasing member. The latch has an inclined unlatching surface allowing the latch to automatically unlatch when the rear section is moved toward the rear of the vehicle, and because the biasing member forces the latch into the catch opening, the latch initially resists forward movement of the rear section toward the rear of the vehicle.

In another embodiment, the carrier includes a lock assembly having a first lock opening in the midsection and a second lock opening in the rear section with a lock pin extending through the lock openings to substantially prevent relative movement between the midsection and the rear section. The lock pin has a restraining end which cannot pass through the openings and a lock receiving end. A lock member locks onto the lock receiving end to hold and lock the lock pin in the openings. Preferably, the lock assembly has third and fourth lock openings in the midsection and rear section, respectively, through which the lock pin also extends. To reduce noise, nylon bushings are inserted into the second and fourth lock openings of the rear section, and the lock pin extends through the nylon bushings.

In still another embodiment, the carrier includes an expandable sleeve which encloses the telescopic coupling between the midsection and the rear section. Preferably, the sleeve comprises an accordion sleeve with a plurality of expandable and compressible corrugations. The telescopic coupling comprises three slide members with an intermediate slide member interposed between and separated from the other two slide members by ball bearings.

In a further embodiment, the carrier includes an auxiliary equipment carrier mounted on the frame assembly by an auxiliary frame member which is removably held in an auxiliary opening of the frame assembly. Preferably, the frame assembly includes an upwardly extending joining member defining the auxiliary opening. The auxiliary equipment carrier includes a base plate and a hinge plate hingably attached thereto. A closure knob is provided to hold the hinge plate closed and secure skies between the plates.

In a still further embodiment, the carrier further includes a cargo unit extension member connected to a cargo unit support structure carried on the rear section. Preferably, the extension member includes a base end removably connected to a side of the cargo unit support structure. The extension member extends transversely to the rear section and comprises a platform cargo unit. An additional extension cargo unit is preferably attached to the opposite side of the cargo unit support structure.

BRIEF DESCRIPTION OF THE DRAWING FIGURES

Preferred embodiments of the present invention are described in detail below with reference to the attached drawing figures, wherein:

FIG. 1 is a side view of a hitch carrier according to the present invention with a cargo unit shown in a traveling position and illustrating an auxiliary equipment carrier in combination with the hitch carrier;

FIG. 2 is a side view of the hitch carrier of FIG. 1 with the cargo unit shown in a remote position;

FIG. 3 is a top view of the hitch carrier and auxiliary equipment carrier of FIG. 1 in which the hitch carrier has a corner thereof broken away for illustration;

FIG. 4 is a fragmentary rear view of the hitch carrier of FIG. 1 taken from the perspective of line 4—4 in FIG. 2 and having a corner thereof broken away for illustration;

FIG. 5 is a rear view of the auxiliary equipment carrier of FIG. 1 taken from the perspective of line 5—5 in FIG. 1 and having a middle portion thereof broken away for illustration;

FIG. 6 is a vertical and transverse cross-sectional view taken along line 6—6 in FIG. 1 of a latch for limiting movement of the cargo unit;

FIG. 7 is a fragmentary, vertical, and longitudinal cross-sectional view of the latch of FIG. 6;

FIG. 8 is a vertical and transverse cross-sectional view taken along line 8—8 in FIG. 7 illustrating the latch of FIG. 6 in a latched position;

FIG. 9 is a top view of an alternate embodiment of a hitch carrier according to the present invention and having a portion thereof broken away for illustration;

FIG. 10 is a fragmentary side view of the hitch carrier of FIG. 9 with a cargo unit shown in a traveling position;

FIG. 11 is a fragmentary side view of the hitch carrier of FIG. 9 with a cargo unit shown in a remote position;

FIG. 12 is a rear end view of the hitch carrier of FIG. 9 taken from the perspective of line 12—12 in FIG. 10 and illustrating a telescopic coupling;

FIG. 13 is a vertical and transverse cross-sectional view taken along line 13—13 in FIG. 1 of a locking assembly;

FIG. 14 is a fragmentary top view of an alternate embodiment of the hitch carrier having two middle portions;

FIG. 15 is a sideview of the hitch carrier of FIG. 14; and

FIG. 16 is a fragmentary end view of the hitch carrier of FIG. 14.

DETAILED DESCRIPTION OF THE PREFERRED EMBODIMENTS

The drawing figures illustrate a hitch carrier 20 constructed in accordance with a preferred embodiment of the invention. As best illustrated in FIGS. 1–3, the hitch carrier 20 includes a frame assembly 22 including cargo unit support structure 24 and a cargo unit 26. The hitch carrier is removably mounted to the rear of a vehicle 28 having closure structure, such as a hatch 30, for closing a rear entrance of the vehicle. The vehicle is provided with a conventional hitch 32 having an open ended and rearwardly extending tubular hitch sleeve 34. The frame assembly 22 is inserted into the hitch sleeve 34 to mount the hitch carrier 20 to the rear of the vehicle 28. The cargo unit 26 is shiftable between the traveling position shown in FIG. 1 and the remote position shown in FIG. 2. The remote position allows the closure structure to swing open without striking the cargo unit 26. Thus, the rear entrance of the vehicle 28 is accessible without removing the hitch carrier.

The hitch carrier 20 includes several features which, in combination, operate to make the hitch carrier safer, quieter, and capable of carrying more and larger equipment. Those features include a latch mechanism 36, a lock assembly 38, a telescoping assembly 40, an auxiliary equipment carrier 42, and cargo unit extension members 44, 46 (FIG. 9). These features will be described in turn below following a description of the frame assembly 22 and cargo unit 26.

Referring to FIGS. 2, 6, and 7, the frame assembly 22 includes an elongated forward section 48, an elongated joining section 50, an elongated midsection 52, and an elongated rear section 54. The forward section 48 comprises a tubular member sized and configured for insertion into the hitch sleeve 34 in a disposition extending rearwardly from the hitch sleeve. The hitch sleeve 34 and the forward section 48 each comprise lock pin openings (not shown) on the opposite sidewalls thereof to receive a locking member 56.

The joining section 50 is tubular and elongated between a lower end 58 and an upper end 60. The joining section is attached to the forward section 48 adjacent to its lower end 58, and the joining section is attached to the midsection adjacent its upper end 60. Thus, the joining section connects the forward and rear sections. The joining section 50 extends upwardly in a substantially vertical direction from the forward section to the midsection. The joining section is preferably hollow defining an auxiliary equipment carrier opening 62 (FIG. 3) for mounting the auxiliary equipment carrier 42 to the hitch carrier 20.

The tubular midsection 52 projects rearwardly from the joining section 50 and is held substantially parallel to the forward section 48 with both the forward section 48 and midsection 52 being substantially horizontal. The rear section 54 is telescopically coupled with and slidably mounted on the midsection for substantially linear movement along a length of the midsection through a plurality (essentially infinite) number of unlatched positions between the traveling and remote positions substantially parallel to an axis of the vehicle hitch. As best illustrated in FIG. 6, the rear section 54 includes a top plate 55 and an elongated U-shaped member 57 with top flanges 51, 53 welded to the top plate 55. The U-shaped member 57 is sized to slidably and snugly receive the midsection therein. The top plate 55 and top flanges 51, 53 are wider than the channel portion of the U-shaped member creating stabelizing plates 59, 61 extending horizontaly from the top of the rear section.

Referring to FIGS. 2 and 4, the cargo unit support structure 24 is carried by the rear section in a transversely extending relationship to the rear section. The cargo unit support structure 24 includes cross members 64, 66 attached to the cargo unit 26 with conventional fasteners 68. The cross members extend transversely to the rear section and intersect the rear section at the in midpoints. The cross members are also spaced apart along the length of the rear section. Front and rear support arms 70, 72 extend transversely to the rear section and are positioned beneath the cross members 64, 66. The support arms attach to the bottom of the rear section and angle upwardly therefrom to connect with the cross members which extend across the top of the rear section.

The cargo unit 26 has hand holds 74 adjacent its bottom and a hingably mounted lid 76. The lid 76 is aerodynamic and has a lid handle 78 and a locking mechanism 80 for locking the lid in the closed position. The cargo unit defines an internal cargo space for receiving luggage and equipment. The cargo unit is mounted on the cargo unit support structure 24 with the fasteners 68, and thus, the cargo unit is shiftable with the rear section between the traveling and remote positions.

Referring to FIGS. 2 and 6–8, the latch mechanism 36 is connected to the frame assembly 22 and automatically latches the rear section to the midsection when the rear section has been moved to the predetermined remote position relative to the midsection. The latch mechanism is also operable to automatically unlatch the rear section from the midsection when the rear section is moved forwardly toward the rear entrance of the vehicle 28.

The latch mechanism includes a first catch opening 82 through the bottom of the midsection, a second catch opening 84 through the bottom of the rear section, and a latch 86 pivotally mounted on the rear section. The latch is pivotally mounted to the rear section between two pivot pin mounting plates 88, 90 which are welded to the sidewalls of the rear section and extend inwardly toward the center of the rear section. Each pin mounting plate includes an aperture 92 receiving a pivot pin 94 therethrough. Each pin mounting plate also includes a biasing aperture 96 receiving a biasing member 98. The biasing member 98 is positioned under the latch 86 and biases the latch upwardly toward the rear section and midsection.

The latch 86 has a pivot end 100 with a pivot opening 102 receiving the pivot pin 94 therethrough. The latch also includes an unlatching surface 104 and a rearward facing stop surface 106 which are generally opposite the pivot end 96. The biasing member 98 is positioned adjacent to the unlatching and stop surfaces 104, 106. The first and second catch openings 82, 84 are located, so that they are aligned when the rear section is moved to the remote position. When the first and second catch openings are aligned, the biasing automatically member introduces the latch 86 into the catch openings, so that the stop surface 106 engages a rearward portion of the catch openings. Thus, the latch operates to substantially prevent the rear section from moving beyond the remote position away from the rear of the vehicle.

The unlatching surface 104 is inclined in an upward direction from front to back, so that it faces forwardly toward the rear of the vehicle. When the rear section 54 is moved toward the rear of the vehicle the inclined unlatching surface engages the forward portion of the catch openings and progressively forces the latch out of the catch openings 82, 84 as the rear section is progressively moved toward the rear of the vehicle. Because the biasing member forces the latch into the catch openings, the latch initially resists forward movement of the rear section toward the rear of the vehicle. After the latch is removed from the catch openings, a rounded tip 108 of the latch slides against the underneath side 110 of the midsection.

Referring to FIGS. 1 and 13, the lock assembly 38 is positioned beneath the carrier support structure 24 adjacent a rearward end 111 of the rear section and includes four lock openings 112, 114, 116, 118. The first and third lock openings 112, 116 are formed in the opposing sidewalls of the midsection, and the second and fourth lock openings 114, 118 are formed in the opposing sidewalls of the rear section; so that the first and second openings 112, 114 are spaced apart from the third and fourth openings 116, 118 to stabilize the lock assembly 38 and frame assembly 22. All four of the lock openings are positioned to be aligned when the rear section has been moved to the traveling position.

A lock pin 120 is provided with an elongated shaft 122 extending through the lock openings. The lock pin includes a restraining end 124 configured so that it will not pass through the lock openings. The restraining end is preferably configured by simply bending the end of the elongated shaft. The lock pin also includes a lock receiving end 126 opposite the restraining end 124. A lock member 128 is locked onto the lock receiving end 126. Preferably, a pair of nylon bushings 130, 132 are inserted into the second and fourth lock openings 114, 118 of the rear section, and the elongated shaft 122 of lock pin 120 is extended through the nylon bushings 130, 132 to reduce noise. With the lock member in place, the lock pin cannot be removed from the lock openings, and the rear section cannot be moved from the traveling position. The locking member 56 which locks the forward section 48 of the frame assembly 22 into the hitch sleeve 34 comprises substantially the same configuration as the lock assembly 38.

Referring to FIGS. 1, 2, and 7, the telescopic assembly 40 comprises the interfitted telescopic coupling between the midsection and the rear section, a forward stop 134, an expandable sleeve 135, and the latch assembly 36 acting as a rearward stop. To telescopically couple the midsection and the rear section, the rear section is slidably received around the midsection, so that the rear section slides along the length of the midsection.

The forward stop 134 and latch assembly operate to keep the forward end 136 of the rear section between the forward and rearward ends 138, 140 of the midsection as the rear section slides on the midsection. The forward stop 134 includes a pair of stop slots 142 on the opposite sidewalls of the forward end 136 of the rear section. The stop slots engage a stop pin 144 extending through the midsection adjacent to the forward end 138 of the midsection. Preferably, at least one of either the pin or both of the slots is padded for noise reduction. When the stop slots 142 engage the stop pin, the rear section is in the traveling position, and the lock openings 112–118 are aligned to receive the lock pin 120. The lock assembly 38, which operates as described above, limits the rearward movement of the rear section, so that the rear section does not slide off the midsection.

The expandable sleeve 135 extends from the forward end 138 of the midsection to the forward end 136 of the rear section to substantially enclose the telescopic coupling throughout the rear sections entire range of movement as limited by the forward stop 134 and the latch mechanism 36. Because the sleeve 135 covers the telescopic coupling, there is substantially less opportunity for injury, and grease used in the coupling is contained thereby preventing clothes from becoming grease stained. The sleeve is connected adjacent to the forward end 138 of the midsection with a constriction ring 146 and to the forward end 136 of the rear section with a plurality of fasteners 147 which connect a sleeve flange 148 to a rear section flange 150. The expandable sleeve preferably comprises an accordion sleeve with a plurality of corrugations 152 which expand to elongate the sleeve and compress to shorten the sleeve as the rear section is moved between the remote and traveling positions, respectively.

Referring to FIGS. 1, 3, and 5, the auxiliary equipment carrier 42 is mounted on an auxiliary frame member 154 which is removably received in the auxiliary carrier opening 62 (FIG. 3) defined by the hollow joining section 50 of the frame assembly 22. The auxiliary frame member extends substantially vertically from the joining member 50 and is held therein by a pin 156 extending through both the joining member and the auxiliary frame member. A safety pin 158 secures the pin 156 in place.

The auxiliary carrier 42 includes an attachment member 160 slidably received on the auxiliary frame member 154. A pair of impingement screws 163 are used to hold the auxiliary carrier in a desired location. In the embodiment shown, the auxiliary carrier has a base plate 162 connected to the attachment member 160, a hinge plate 164, and a hinge 166 which hingably connects the hinge plate 164 to the base plate 162. An adjustable and threaded closure knob 168 is positioned opposite the hinge 166 to hold the hinge plate in the closed position. To close the hinge plate, the knob 168 is pivoted to the open position, shown in dashed lines in FIG. 3, and the hinge plate is moved to the closed position. The knob is then pivoted to the closed position, shown in solid lines in FIG. 3, so that the knob shaft 169 is inserted into an open end slot 171 in the hinge plate. The knob is then rotated to tighten the hinge plate against the base plate, and an upturned edge 173 of the hinge plate keeps the knob 168 from pivoting into the open position.

The auxiliary carrier 42 shown is configured to carrier a pair of skies 174. To that end, rubber layers 170, 172 are attached to the inner sides of the base plate and the hinge plate. Preferably, one of the rubber layers includes corrugations 176. Though the carrier shown is for skies, other types of auxiliary carriers can be used, such as bicycle carriers.

An alternate embodiment of the hitch carrier is illustrated in FIGS. 9–11 in which elements similar to those already described have been given the corresponding reference numeral with the distinguishing suffix A added thereto. The alternate embodiment includes a platform cargo unit 26A, and the two cargo unit extension members 44, 46. The platform cargo unit is substantially flat without a lid and may include a side wall 178. The support surface 179 of the platform cargo unit is preferably made with expanded metal. The platform cargo unit 26A is loaded by strapping or tieing luggage thereto.

The cargo unit extension members 44, 46 are generally rectangular and substantially flat with their support surfaces 181 formed from expanded metal. Each extension includes a base end 180 and an outer end 182. The base ends 180 are removably connected adjacent to the opposed outer ends 184, 186 of the cargo unit support structure 24A with fasteners 188. Specifically, the extension members are connected to the cross members 64A, 66A. The extension members preferably extend from their base ends 180 to their outer ends 182 in a direction transverse to the rear section 54A.

Referring additionally to FIG. 12, an alternate embodiment of the telescopic assembly 40A utilizes a pair of multiple member telescopic couplings 190. The couplings are operatively interposed between the rear section 54A and the midsection 52A on opposite sides of the midsection. Each coupling 190 preferably includes a first slide member 192 connected to the midsection, a second slide member 194 connected to the rear section, and a third intermediate slide member 196 slidably interposed between the first and second slide members 192, 194. Each of the slide members has a height which is vertically oriented, so that they are aligned to provide the optimal resistance to bending from the substantially vertical force imported thereon by the weight of the cargo carrier. A first set of freely rotatable components, preferably ball bearings 198, is interposed between the first slide member 192 and the intermediate slide member 196, and a second set of ball bearings 200 is interposed between the second slide member 194 and the intermediate slide member 196. The preferred telescopic couplings 190 are available from Austin Hardware and Supply by calling 1-800-821-3520 and by requesting catalog #3600 and designating the desired size. An expandable sleeve may also be provided to cover the telescopic assembly 40A to increase safety.

As the rear section is moved relative to the midsection, the intermediate slide and the plurality of ball bearings provide a smooth telescoping motion between the midsection and the rear section. When the rear section reaches the remote position, rubber covered stops 202, 204 (schematically illustrated), which are positioned between the first slide and the intermediate slide and between the second slide and the intermediate slide, respectively, are engage to prevent the rear section from moving rearwardly beyond the remote position.

In operation and referring to FIGS. 1 and 2, the hitch carrier 20 is hitched to the vehicle trailer hitch 32 and loaded. When it is necessary to open the rear closure structure/hatch 30, the lock pin 120 of the lock assembly 38 is removed and the rear section 54 is to telescopically shifted in the rearward direction away from the vehicle 28 until the latch mechanism 36 stops the movement of the rear section 54 in the remote position. The remote position is predetermined, so that as the hatch swings open, it does not strike the cargo unit 26.

After the hatch 30 is closed, the rear section 54 and attached cargo unit 26 are forced forwardly toward the rear of the vehicle thereby disengaging the latching mechanism 36. The rear section slides forwardly until the forward stop 134 is engaged. The lock assembly 38 is reconnected to lock the rear section in the traveling position.

If the auxiliary cargo carrier 42 is used, the pin 156 is removed, and the auxiliary frame member 154 is removed from the joining member 50. Once removed, the hatch can swing open unobstructed. The auxiliary cargo carrier is thus advantageous because the cargo does not need to be removed from between the plates 162, 164 to open the hatch.

The described features of the inventive hitch carrier 20 substantially improve its function and operation. For example, the automatic latch mechanism 36, lock assembly 38, and expandable sleeve 135 make the hitch carrier 20 safer. The nylon bearings 130, 132 of the lock assembly 38 reduce noise, and the auxiliary carrier 42 and extension members 44, 46 increase the carrying capacity of the hitch carrier. Further, the multiple member telescoping couplings 190 and automatic latch mechanism 36 make the rear section easier to move between the traveling and remote positions.

An alternate frame assembly 210 shown in FIGS. 14–16 includes a forward section 212 for connection to the hitch sleeve 34 and a forked midsection 216. The midsection 216 includes a transverse arm 218 and spaced apart legs 220, 222. Preferably, the multi-member telescope couplings 190 join the legs 220, 222 to spaced apart legs 224, 226 of the rear section 228. The rear section also includes a preferably continuous top plate 230 connecting the rear legs 224, 226. The rear legs are preferably positioned outside of the midsection legs 220, 222, and the top plate 230 slides over the top of the midsection 216. Thus, the couplings 190 are positioned outside the midsection legs and inside the rear legs. Each of the rear legs 224, 226 preferably includes an inwardly extending safety tab 232, 234 which substantially enclose the couplings 190 for safety. The cargo unit 26 is connected to the top plate 230 with conventional fasteners 236.

The forked frame also includes a forward stop having a stop pin 238 and a stop slot 240 on each midsection leg 220, 222 and the top plate 230, respectively. The forward stops halt the cargo unit 26 in the travel position, and a lock member 242 (shown in dashed lines) extends through one of the rear legs 224 and the corresponding midsection leg 222 to hold the cargo unit in the travel position. The forked frame assembly 210 provides additional stability and strength allowing for larger cargo units.

Although the invention has been described with reference to the preferred embodiments illustrated in the attached drawing figures, it is noted that equivalents may be employed and substitutions made herein without departing from the scope of the invention as recited in the claims.

Having thus described the preferred embodiments of the invention, what is claimed as new and desired to be protected by letters patent includes the following:

We claim:

1. A hitch carrier adapted to be removably mounted at a rear of a vehicle having a swingable closure structure for closing a rear entrance of the vehicle and provided with a conventional hitch having an open-ended, rearwardly extending, tubular hitch sleeve, the carrier comprising:
   a frame assembly;
   a cargo unit;
   the frame assembly being provided with
      an elongated forward section configured for insertion in the hitch sleeve in a disposition extending rearwardly from the sleeve,
      an elongated midsection connected to and projecting rearwardly from the forward section, and the midsection having a midsection forward end,
      an elongated rear section telescopically coupled with and slidably mounted to the midsection for movement along a length thereof between a traveling position and a remote position, and the rear section having a rear section forward end,
      cargo unit support structure carried by the rear section in a transversely extending relationship to the rear section and being movable therewith, and
      a multiple member telescopic coupling operatively interposed between the rear section and the midsection to telescopically couple the rear section to the midsection;
   the cargo unit being mounted on the cargo unit support structure and shiftable with the rear section.

2. The hitch carrier according to claim 1 further comprising an expandable sleeve having a sleeve forward end attached to the frame assembly adjacent to the midsection forward end and a sleeve rear end attached to the rear section adjacent to the rear section forward end for substantially enclosing the telescopic coupling made between the midsection and the rear section.

3. The hitch carrier according to claim 2 wherein the expandable sleeve comprises an accordion sleeve having a plurality of expandable and compressible corrugations, the corrugations expanding to elongate the sleeve when the rear section is moved to the remote position, and the corrugations compressing to shorten the sleeve when the rear section is moved to the traveling position.

4. The hitch carrier according to claim 1 wherein the telescopic coupling includes a first slide member connected to the midsection, a second slide member connected to the rear section, an intermediate slide member slidably interposed between the first and second slide members, and a plurality of rotatable components interposed between the intermediate slide member and the first slide member and between the intermediate slide member and the second slide member providing smooth telescoping motion between the midsection and the rear section.

5. The hitch carrier according to claim 4 wherein the telescopic coupling comprises stops to limit the extension of the telescopic coupling, and the rotatable components comprise ball bearings.

6. The hitch carrier according to claim 4 wherein the first, second and intermediate slide members each have a substantially vertically oriented height to provide optimal bending resistance to vertical forces from the cargo unit.

7. The hitch carrier according to claim 1 wherein the midsection comprises spaced apart legs and the rear section comprises spaced apart legs telescopically coupled with the legs of the midsection.

8. A hitch carrier adapted to be removably mounted at a rear of a vehicle having a swingable closure structure for closing a rear entrance of the vehicle and provided with a conventional hitch having an open-ended, rearwardly extending, tubular hitch sleeve, the carrier comprising:
   a frame assembly;
   a cargo unit;
   the frame assembly being provided with
      an elongated forward section configured for insertion in the hitch sleeve in a disposition extending rearwardly from the sleeve,
      an elongated midsection connected to and projecting rearwardly from the forward section,
      an elongated rear section telescopically coupled with and slidably mounted to the midsection for movement along a length thereof between a traveling position and a remote position allowing access to the rear entrance of the vehicle, and
      cargo unit support structure having opposed sides, and being carried by the rear section in a transversely extending relationship to the rear section and being movable therewith,
   the cargo unit being mounted on the cargo unit support structure and shiftable with the rear section; and
   a cargo unit extension member removably connected to the cargo unit support structure.

9. The hitch carrier according to claim 8 wherein the cargo unit extension member includes a base end and an outer end, the base end is removable connected to one of the opposed sides of the cargo unit support structure, and the cargo unit extension member extends from the base end to the outer end transversely to the rear section.

10. The hitch carrier according to claim 8 further comprising a second cargo unit extension member removably connected to the cargo unit support structure in an opposing relationship to the first cargo unit extension member.

11. The hitch carrier according to claim 8 wherein the cargo unit and cargo unit extension member comprises platform cargo units.

* * * * *